United States Patent [19]
Gamulo

[11] Patent Number: 5,826,768
[45] Date of Patent: Oct. 27, 1998

[54] VEHICLE MOUNTED CART

[76] Inventor: Douglas D. Gamulo, 2832 Ipolani St., Pukalani, Hi. 96768

[21] Appl. No.: 940,498

[22] Filed: Sep. 30, 1997

[51] Int. Cl.⁶ ..................................................... B60R 11/00
[52] U.S. Cl. ........................... 224/486; 224/484; 224/488; 224/511; 224/513
[58] Field of Search ..................................... 224/486, 488, 224/489, 492, 495, 511, 512, 513, 518, 484, 42.13, 42.14

[56] References Cited

U.S. PATENT DOCUMENTS

| | | | |
|---|---|---|---|
| 2,157,186 | 5/1939 | Pinter, Sr. et al. | 224/486 |
| 2,663,474 | 12/1953 | Kelly | 224/484 |
| 4,593,840 | 6/1986 | Chown | 224/484 |
| 4,726,597 | 2/1988 | Hicklin | 224/492 |
| 5,029,740 | 7/1991 | Cox | 224/484 |

Primary Examiner—David J. Walczak

[57] ABSTRACT

A vehicle mounted cart is provided including a vehicle, a frame, a handle support pivotally mounted to the frame, and a pair of wheel assemblies coupled to the frame, whereby the frame is removably coupled to the vehicle wherein the handle support acts as a support when the frame is coupled to the vehicle and a handle when the frame is removed from the vehicle and utilized as a cart.

4 Claims, 3 Drawing Sheets

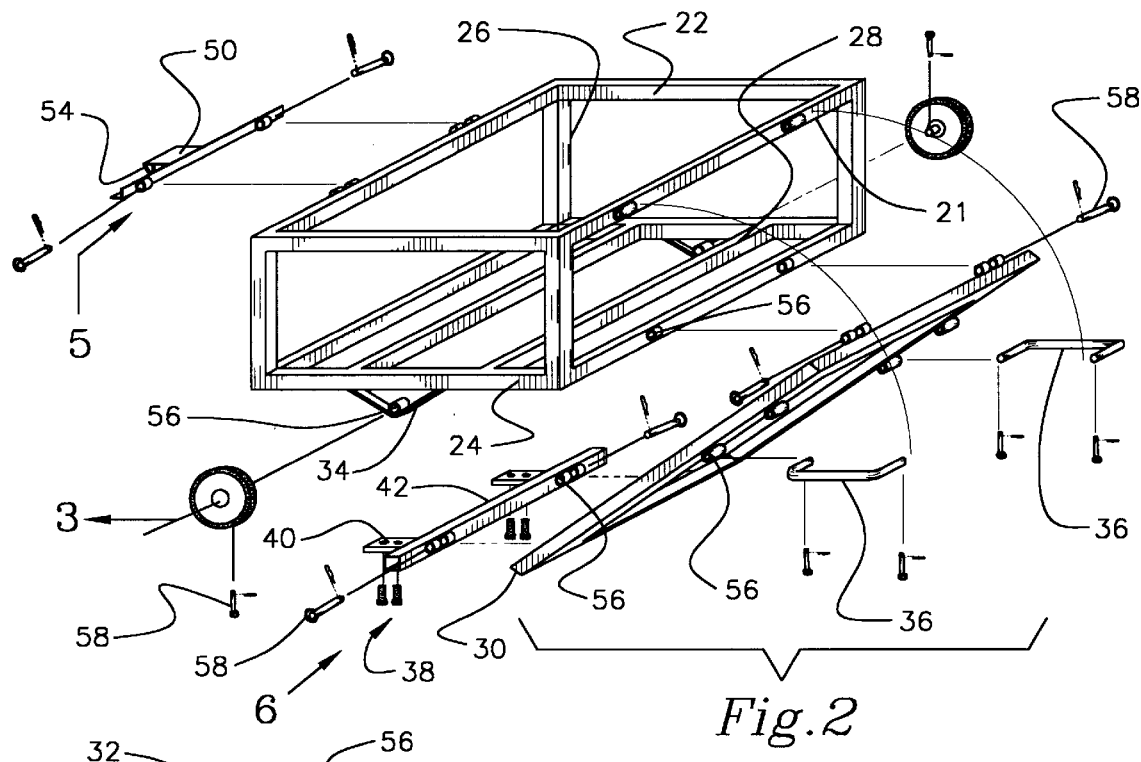
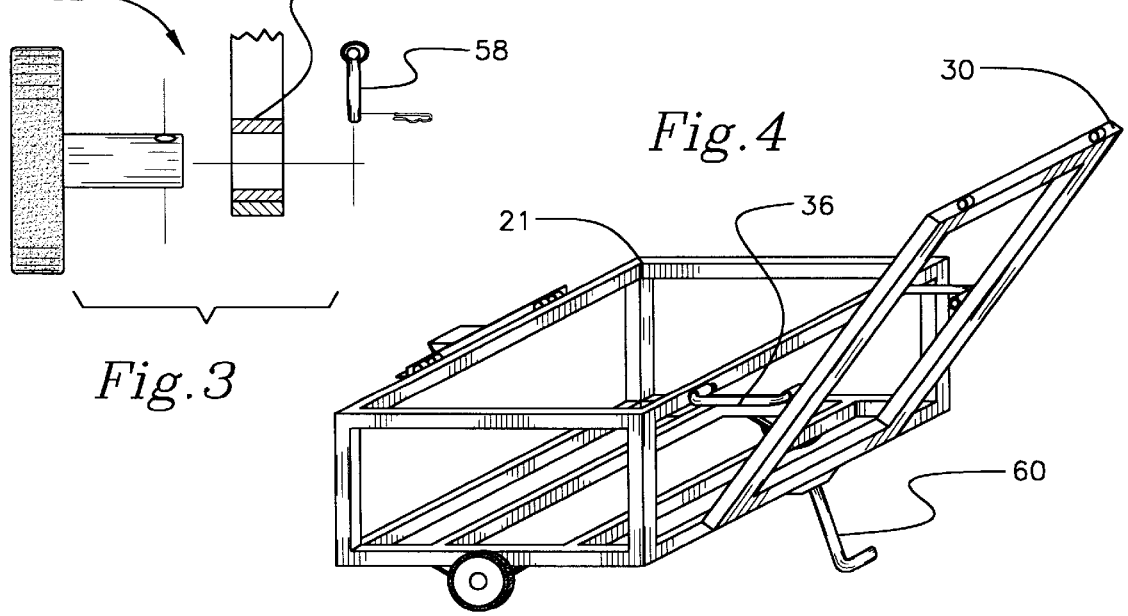

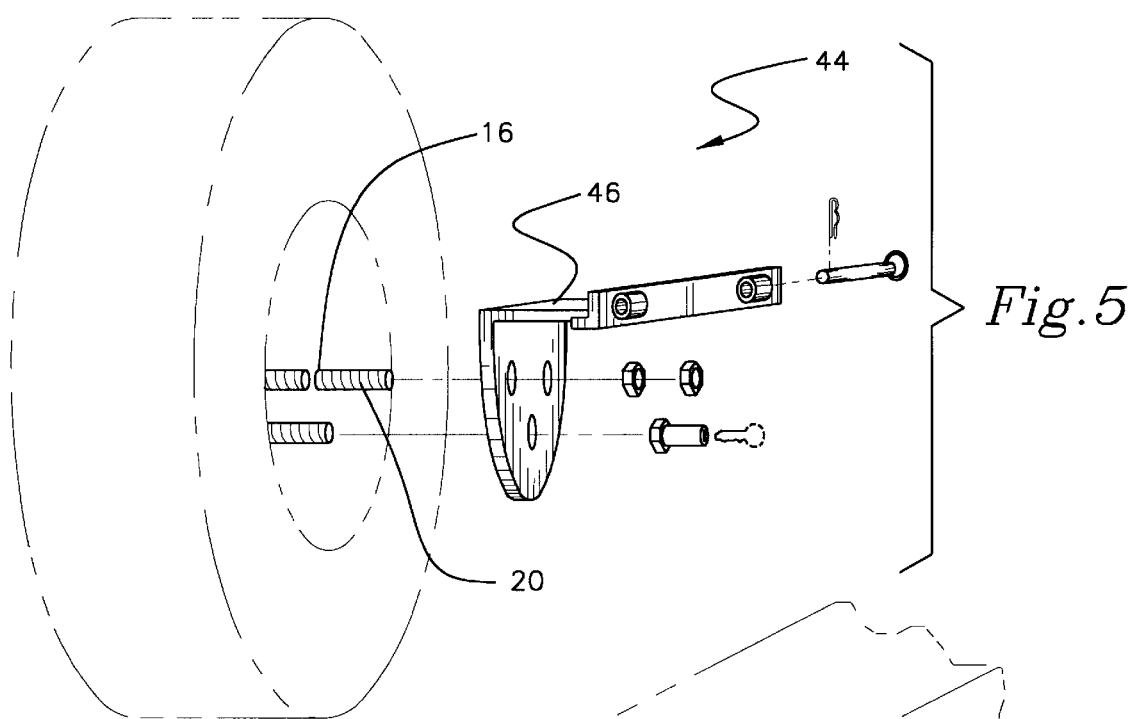
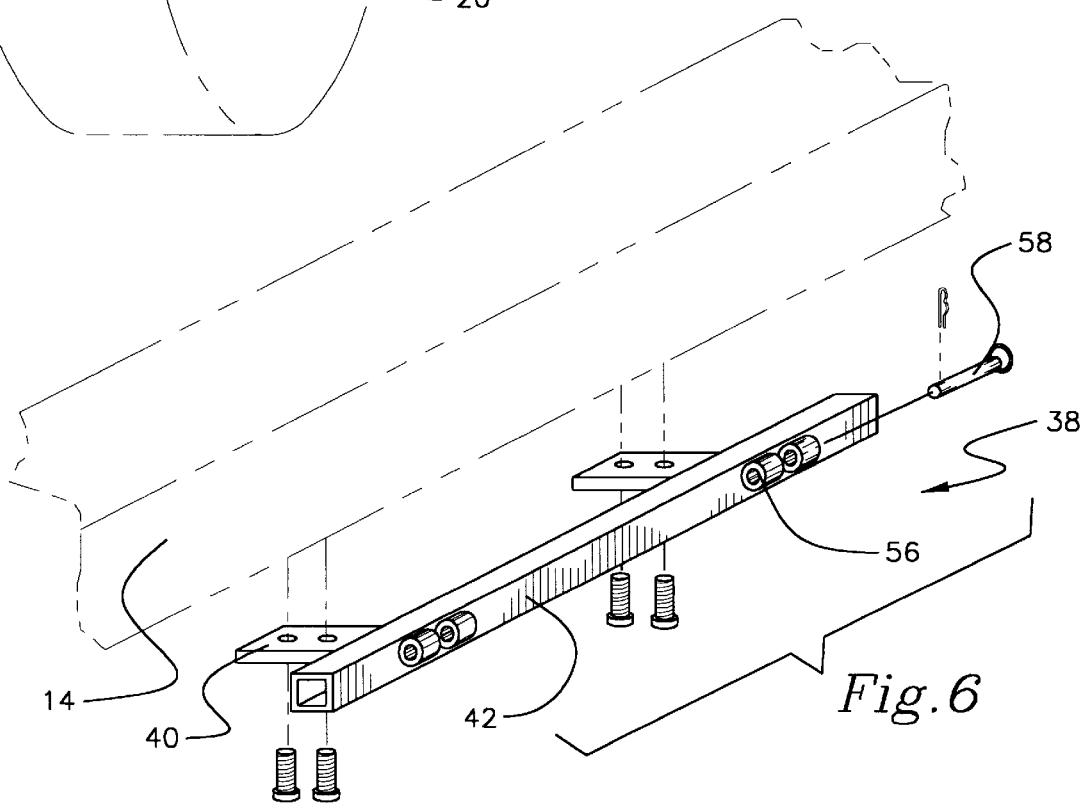

the vehicle. A pair of generally U-shaped connector bars each have a pair of ends removably coupled between a central extent of the corresponding long parallel side portion of the handle support and the top extent of the frame for reasons that will become apparent hereinafter. FIG. 6 shows a first vehicle mounting assembly including a pair of rectangular strips each having a first end coupled to a bottom surface of the bumper of the vehicle. A linear bar is coupled between second ends of the strips in parallel relationship with the bumper. The linear bar is adapted to be removably coupled to the handle support. Associated therewith is a second vehicle mounting assembly including an inverted L-shaped plate. As shown in FIG. 5, the plate has a vertical extent mounted to the bolts of the vehicle and a horizontal extent extending rearwardly therefrom. Hingably coupled to the top extent of the frame opposite the handle support is a quick release mechanism. Such mechanism includes a latch for being removably coupled to the horizontal extent of the second vehicle mounting assembly. A kickstand is provided having an L-shaped configuration. The kickstand is pivotally mounted to the bottom extent of the frame adjacent the coupling of the frame with the handle support, as shown in FIG. 4.

VEHICLE MOUNTED CART

BACKGROUND OF THE INVENTION

1. Field of the Invention

The present invention relates to carts and more particularly pertains to a new vehicle mounted cart for providing a cart which may be removably mounted to a vehicle with a handle that serves as a support when attached to the vehicle.

2. Description of the Prior Art

The use of carts is known in the prior art. More specifically, carts heretofore devised and utilized are known to consist basically of familiar, expected and obvious structural configurations, notwithstanding the myriad of designs encompassed by the crowded prior art which have been developed for the fulfillment of countless objectives and requirements.

Known prior art carts include U.S. Pat. No. 5,328,066; U.S. Pat. No. 4,629,203; U.S. Pat. No. Des. 349,989; U.S. Pat. No. Des. 336,709; U.S. Pat. No. 4,889,360; and U.S. Pat. No. Des. 261,125.

In these respects, the vehicle mounted cart according to the present invention substantially departs from the conventional concepts and designs of the prior art, and in so doing provides an apparatus primarily developed for the purpose of providing a cart which may be removably mounted to a vehicle with a handle that serves as a support when attached to the vehicle.

SUMMARY OF THE INVENTION

In view of the foregoing disadvantages inherent in the known types of carts now present in the prior art, the present invention provides a new vehicle mounted cart construction wherein the same can be utilized for providing a cart which may be removably mounted to a vehicle with a handle that serves as a support when attached to the vehicle.

The general purpose of the present invention, which will be described subsequently in greater detail, is to provide a new vehicle mounted cart apparatus and method which has many of the advantages of the carts mentioned heretofore and many novel features that result in a new vehicle mounted cart which is not anticipated, rendered obvious, suggested, or even implied by any of the prior art carts, either alone or in any combination thereof.

To attain this, the present invention generally comprises a vehicle with a rear bumper and a spare tire mount situated on a rear face thereof. As shown in FIG. 5, the spare tire mount includes a plurality of threaded bolts fixedly coupled to the vehicle and extending rearwardly therefrom. Included is a frame with a rectilinear configuration having a rectangular top extent, a rectangular bottom extent and a plurality of peripheral extents mounted between corners of the top extent and bottom extent. As such, the top extent resides directly above the bottom extent to define an interior space. The frame further includes a plurality of spaced parallel floor bars integrally coupled between short parallel sides of the bottom extent in parallel with long parallel sides thereof thereby defining a floor. Next provided is a handle support having a rectangular configuration with a pair of short parallel end portions and a pair of long parallel side portions. One of the short parallel end portions is pivotally mounted to one of the long parallel sides of the bottom extent of the frame. As best shown in FIG. 2, a pair of wheel assemblies are provided each including a V-shaped axle mount coupled to the short parallel sides of the bottom extent of the frame. Each of such axle mounts is equipped with a wheel rotatably coupled thereto.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle mounted cart apparatus and method which has many of the advantages of the carts mentioned heretofore and many novel features that result in a new vehicle mounted cart which is not anticipated, rendered obvious, suggested, or even implied by any of the prior art carts, either alone or in any combination thereof.

It is another object of the present invention to provide a new vehicle mounted cart which may be easily and efficiently manufactured and marketed.

It is a further object of the present invention to provide a new vehicle mounted cart which is of a durable and reliable construction.

An even further object of the present invention is to provide a new vehicle mounted cart which is susceptible of a low cost of manufacture with regard to both materials and labor, and which accordingly is then susceptible of low prices of sale to the consuming public, thereby making such vehicle mounted cart economically available to the buying public.

Still yet another object of the present invention is to provide a new vehicle mounted cart which provides in the apparatuses and methods of the prior art some of the advantages thereof, while simultaneously overcoming some of the disadvantages normally associated therewith.

Still another object of the present invention is to provide a new vehicle mounted cart for providing a cart which may be removably mounted to a vehicle with a handle that serves as a support when attached to the vehicle.

Even still another object of the present invention is to provide a new vehicle mounted cart that includes a vehicle, a frame, a handle support pivotally mounted to the frame, and a pair of wheel assemblies coupled to the frame, whereby the frame is removably coupled to the vehicle wherein the handle support acts as a support when the frame is coupled to the vehicle and a handle when the frame is removed from the vehicle and utilized as a cart.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is an exploded view of the present invention.

FIG. 3 is a close-up view of one of the wheel assemblies of the present invention.

FIG. 4 is a perspective view of the present invention in a second mode of operation when it is utilized as a cart.

FIG. 5 is an exploded view of the second vehicle mounting assembly of the present invention.

FIG. 6 is an exploded view of the first vehicle mounting assembly of the present invention.

DESCRIPTION OF THE PREFERRED EMBODIMENT

Figure 1:
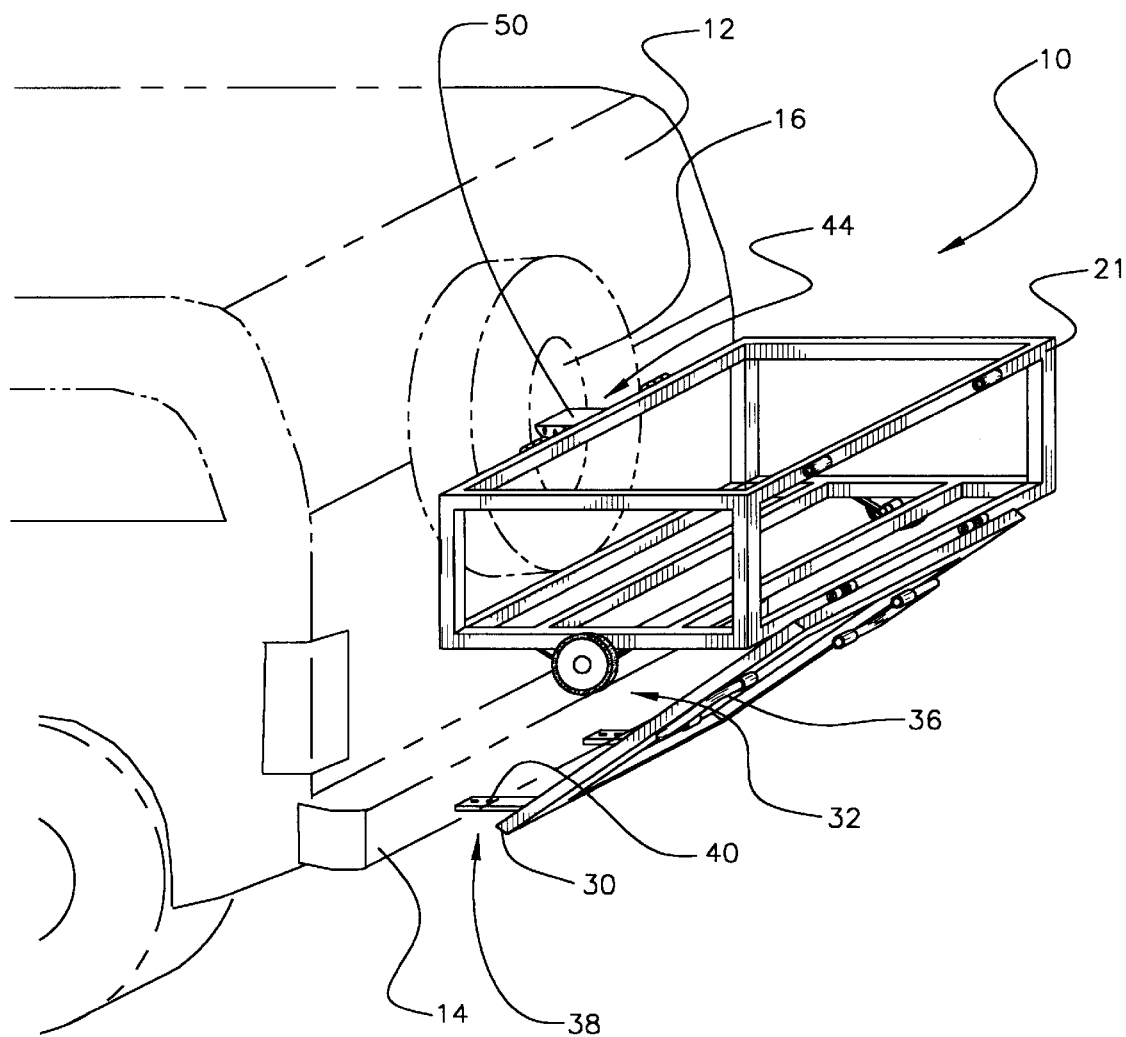
FIG. 1 is a perspective view of a new vehicle mounted cart according to the present invention.

With reference now to the drawings, and in particular to FIGS. 1 through 6 thereof, a new vehicle mounted cart embodying the principles and concepts of the present invention and generally designated by the reference numeral 10 will be described.

The present invention, as designated as numeral 10, includes a vehicle 12 with a rear bumper 14 and a spare tire mount 16 situated on a rear face thereof. As shown in FIG. 5, the spare tire mount includes a plurality of threaded bolts 20 fixedly coupled to the vehicle and extending rearwardly therefrom.

Included is a frame 21 with a rectilinear configuration having a rectangular top extent 22, a rectangular bottom extent 24 and a plurality of peripheral extents 26 mounted between corners of the top extent and bottom extent. As such, the top extent resides directly above the bottom extent to define an interior space. The frame further includes a plurality of spaced parallel floor bars 28 integrally coupled between short parallel sides of the bottom extent in parallel with long parallel sides thereof thereby defining a floor.

Next provided is a handle support 30 having a rectangular configuration with a pair of short parallel end portions and a pair of long parallel side portions. One of the short parallel end portions is pivotally mounted to one of the long parallel sides of the bottom extent of the frame.

As best shown in FIG. 2, a pair of wheel assemblies 32 are provided each including a V-shaped axle mount 34 coupled to the short parallel sides of the bottom extent of the frame. Each of such axle mounts is equipped with a wheel rotatably and removably coupled thereto.

A pair of generally U-shaped connector bars 36 each have a pair of ends removably coupled between a central extent of the long parallel side portion of the corresponding handle support and the top extent of the frame for reasons that will become apparent hereinafter. When removed, the connector bars may be connected solely to the handle support for storage purposes.

FIG. 6 shows a first vehicle mounting assembly 38 including a pair of rectangular strips 40 each having a first end coupled to a bottom surface of the bumper of the vehicle. A linear bar 42 is coupled between second ends of the strips in parallel relationship with the bumper. The linear bar is adapted to be removably coupled to the handle support.

Associated therewith is a second vehicle mounting assembly 44 including an inverted L-shaped plate 46. As shown in FIG. 5, the plate has a vertical extent mounted to the bolts of the vehicle and a horizontal extent extending rearwardly therefrom. As an option, a specially designed bolt may be employed to prevent the removal of the L-shaped plate and spare tire from the vehicle. A further option would be to provide a gas cap removal prevention device.

Hingably coupled to the top extent of the frame opposite the handle support is a quick release mechanism 50. Such mechanism includes a pivoting latch 54 for being removably coupled to a lip of the horizontal extent of the second vehicle mounting assembly.

It should be noted that the removable coupling between the U-shaped connectors and the frame and handle support, between the handle support and first vehicle mounting assembly, and between the quick release assembly and the second vehicle mounting assembly is ideally afforded by way of tubular sleeves 56 and quick release pins 58. Such method of coupling is preferably employed at every interconnection between components where applicable. Note FIG. 2.

A kick stand 60 is provided having an L-shaped configuration. The kickstand is pivotally mounted to the bottom extent of the frame adjacent the coupling of the frame with the handle support, as shown in FIG. 4.

During use in a first mode of operation, the U-shaped connector bars are removed and the handle support is pivoted to reside below the frame. The handle support is further coupled to the first mounting assembly and the quick release mechanism is coupled to the second mount assembly. In such orientation, various items may be stored within the frame while the vehicle is in transit.

In a second mode of operation, the handle support is removed from the first vehicle mounting assembly and the U-shaped connector bars are connected between the frame and the handle support. Such interconnect orients the handle support such that it extends upwardly and outwardly from the frame. Finally, the quick release mechanism is removed from the second vehicle mounting assembly thereby allowing use of the frame as a cart.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle mounted cart comprising, in combination:

a vehicle with a rear bumper and a spare tire mount situated on a rear face thereof, the spare tire mount including a plurality of threaded bolts fixedly coupled to the vehicle and extending rearwardly therefrom;

a frame with a rectilinear configuration having a rectangular top extent, a rectangular bottom extent and a plurality of peripheral extents mounted between corners of the top extent and bottom extent such that the top extent resides directly above the bottom extent to define an interior space, the frame further including a plurality of spaced parallel floor bars integrally coupled between short parallel sides of the bottom extent in parallel with long parallel sides thereof thereby defining a floor;

a handle support having a rectangular configuration with a pair of short parallel end portions and a pair of long parallel side portions, one of the short parallel end portions being pivotally mounted to one of the long parallel sides of the bottom extent of the frame;

a pair of wheel assemblies each including a V-shaped axle mount coupled to the short parallel sides of the bottom extent of the frame each with a wheel rotatably coupled thereto;

a pair of generally U-shaped connector bars each having a pair of ends removably coupled between a central extent of the corresponding long parallel side portion of the handle support and the top extent of the frame;

a first vehicle mounting assembly including a pair of rectangular strips each having a first end coupled to a bottom surface of the bumper of the vehicle with a linear bar coupled between second ends of the strips in parallel relationship with the bumper, the linear bar adapted to be removably coupled to the handle support;

a second vehicle mounting assembly including an inverted L-shaped plate with a vertical extent mounted to the bolts of the vehicle and a horizontal extent extending rearwardly therefrom;

a quick release mechanism including a latch hingably coupled to the top extent of the frame opposite the handle support for being removably coupled to the horizontal extent of the second vehicle mounting assembly;

a kick stand having an L-shaped configuration pivotally mounted to the bottom extent of the frame adjacent the coupling of the frame with the handle support;

whereby in a first mode of operation, the U-shaped connector bars are removed and the handle support pivoted to reside below the frame and coupled to the first mounting assembly and the quick release mechanism coupled to the second mount assembly such that various items may be stored within the frame;

whereby in a second mode of operation, the handle support is removed from the first vehicle mounting assembly and the U-shaped connector bars are connected between the frame and the handle support such that the handle support extends upwardly and outwardly from the frame and the quick release mechanism is removed from the second vehicle mounting assembly thereby allowing use of the frame as a cart.

2. A vehicle mounted cart comprising;

a vehicle;

a frame;

a handle support pivotally mounted to a bottom extent of the frame;

a pair of wheel assemblies coupled to the frame;

a vehicle mounting assembly including an L-shaped plate;

a quick release mechanism including a latch hingably coupled to the frame opposite the handle support for being removably coupled to the vehicle mounting assembly; and a kick stand pivotally mounted to the bottom extent of the frame;

whereby the frame is removably coupled to the vehicle wherein the handle support acts as a support when the frame is coupled to the vehicle and a handle when the frame is removed from the vehicle and utilized as a cart.

3. A vehicle mounted cart as set forth in claim 2 and further including a pair of connectors for selectively fixing the handle support with respect to the frame.

4. A vehicle mounted cart as set forth in claim 2 wherein the frame has a rectilinear configuration having a rectangular top extent and a plurality of peripheral extents mounted between corners of the top extent and bottom extent such that the top extent resides directly above the bottom extent to define an interior space.

* * * * *